C. BERGENER.
LANTERN.
APPLICATION FILED MAY 6, 1909. RENEWED OCT. 20, 1910.

977,775.

Patented Dec. 6, 1910.

Witnesses:
E. A. Volk.
A. S. Dimond.

Inventor
Charles Bergener,
by Wilhelm, Parker & Hand,
Attorneys.

THE NORRIS PETERS CO., WASHINGTON, D. C.

UNITED STATES PATENT OFFICE.

CHARLES BERGENER, OF ROCHESTER, NEW YORK, ASSIGNOR TO C. T. HAM MANUFACTURING COMPANY, OF ROCHESTER, NEW YORK.

LANTERN.

977,775.  Specification of Letters Patent.  Patented Dec. 6, 1910.

Application filed May 6, 1909, Serial No. 494,442.  Renewed October 20, 1910.  Serial No. 588,187.

*To all whom it may concern:*

Be it known that I, CHARLES BERGENER, a citizen of the United States, residing at Rochester, in the county of Monroe and State of New York, have invented a new and useful Improvement in Lanterns, of which the following is a specification.

This invention relates to means, more especially applicable to tubular lanterns, for holding the bail yieldingly in an upright position when it is released, so that the bail will remain standing ready to be again grasped.

The object of the invention is to provide a bail holder which is efficient and convenient in operation and is of simple construction, such as not to add to the usual parts of the lantern or to add appreciably to the cost of manufacture thereof.

Figure 1:
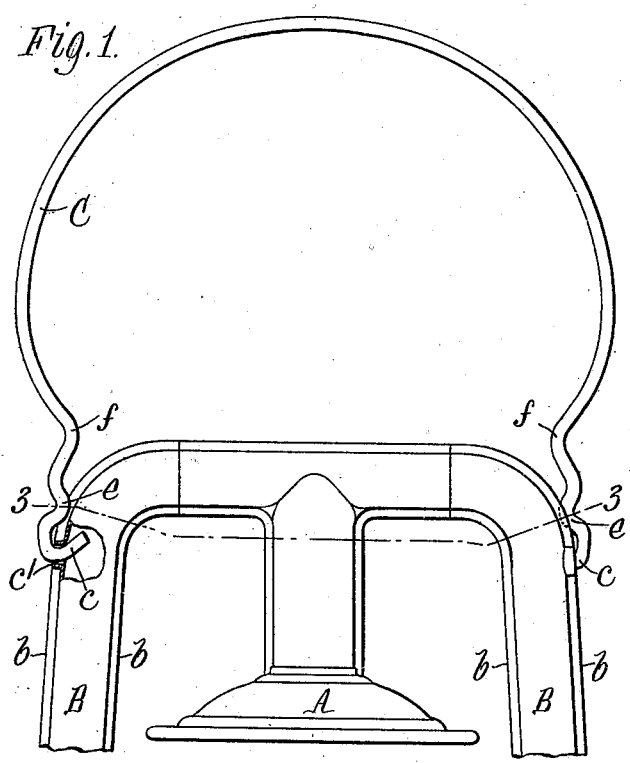
Figure 2:
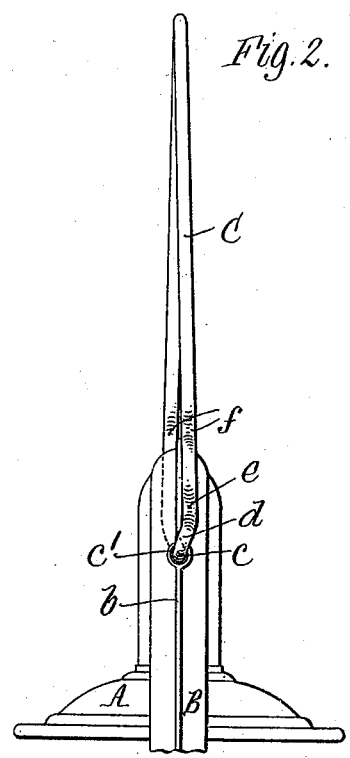
Figure 3:
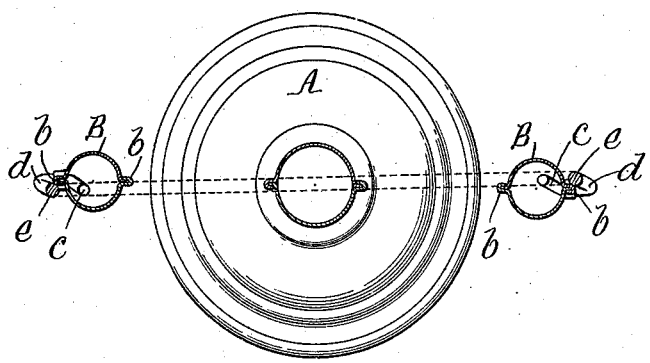
Figure 4:
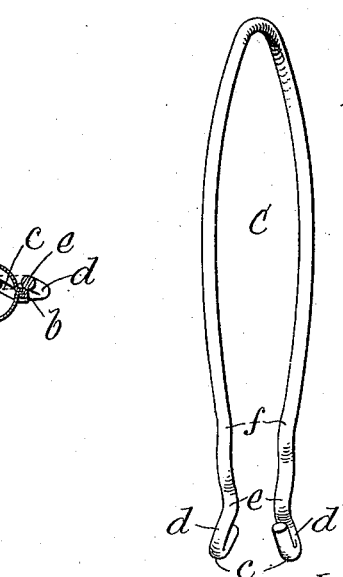

In the accompanying drawings: Figure 1 is a front elevation, partly in section, of the upper portion of a tubular lantern provided with this improved bail holder. Fig. 2 is a side elevation thereof. Fig. 3 is a horizontal section thereof in line 3—3, Fig. 1. Fig. 4 is a perspective view of the bail detached.

Like reference characters refer to like parts in the several figures.

A represents the top portion of a tubular lantern, B B the air tubes, and C the bail.

In the lantern shown, the air tubes are of ordinary construction, consisting of separate halves united at their edges by seams which form outwardly projecting longitudinal ribs *b* at the inner and outer sides of the tubes. The ribs *b* at the outer sides of the tubes are utilized, as hereinafter explained, in holding the bail upright.

The bail C is pivoted to the lantern by inwardly-projecting hooks or pivots *c* at the ends of the bail entering holes or sockets *c'* in the outer sides of the air tubes. The end portions of the bail adjacent to the pivots are bent or offset, on one side of the lantern forwardly and on the other side rearwardly, so that the bail, instead of occupying a plane parallel with the plane of the tubular frame, stands obliquely to such plane at a small angle. The bail is formed in the offset end portions with inwardly-projecting humps *e*, one of which bears, when the bail is in an upright position, against the front side of the rib *b* of the adjacent tube, while the hump at the opposite end of the bail bears against the rear side of the rib on the other tube. The pivot bearings for the bail are located in the transverse central plane of the tubes, while these humps are located one in front and one in rear of such plane and bear respectively against the front and rear sides of the ribs *b* on the tubes, which ribs operate in connection with these humps as outwardly or laterally projecting stops and arrest the movement of the bail when the latter has reached the upright position.

When the bail is swung to an upright position, the hump *e* at one end of the bail will ride over the adjacent rib and spring inwardly beyond the rib so as to prevent the bail from falling back again to the side from which it was raised, while the other hump *e* will engage the rib adjacent to it and prevent the bail from falling over to the other side of the lantern. One or the other hump *e* will thus ride over the rib adjacent to it, depending upon the side from which the bail is raised. The bail is thus prevented from falling to either side from the upright position, but is not so rigidly held that it cannot readily be swung out of the upright position. Preferably the bail is formed so that a little play is left between its humps *e* and the ribs *b* when the bail is upright, so as to allow the lantern a limited swinging motion on the bail when carrying it, which is desirable. The bail shown has the bends *f* usually provided for engaging the air tubes to prevent the bail from falling against the lantern globe, but these bends can be omitted as the humps *e* also perform this function.

In lanterns in which the air tubes are not formed with the projecting seam ribs *b*, the tubes can be specially provided in any suitable manner with correspondingly arranged ribs or projections for the engagement of the humps *e* of the bail.

The described means for holding the bail are exceedingly simple, and to provide the same it is only necessary to bend the bail as explained. No special parts whatever have to be added to the usual parts.

I claim as my invention:

1. The combination with a lantern frame provided on opposite sides with holding projections and with pivot sockets, of a bail which is pivoted in said sockets and which is offset adjacent to its pivots on one side of the frame forwardly and on the other side rearwardly, the bail standing in a plane which intersects the transverse plane of the lantern frame at a small angle and engaging, when in an upright position, one of said frame projections on the front side and the other projection on the rear side, substantially as set forth.

2. The combination with a lantern frame provided on each side with a holding projection and with a pivot socket for a bail, of a bail which is pivoted in said sockets and which is offset adjacent to its pivots on one side of the lantern forwardly and on the other side rearwardly and having adjacent to each offset portion a projection adapted to engage the adjacent frame projection when the bail is in an upright position, one of said bail projections engaging the front side of the adjacent frame projection and the other bail projection engaging the rear side of the adjacent frame projection, substantially as set forth.

3. The combination with a lantern frame provided on each side with a holding projection and with a pivot socket for a bail, of a bail which is pivoted in said sockets and which is offset adjacent to its pivots on one side of the lantern forwardly and on the other side rearwardly and bent adjacent to its offset portion, forming inwardly-projecting humps, which latter, when the bail is in an upright position, engage against said frame projections, on one side of the lantern against the front side of the adjacent projection and on the other side of the lantern against the rear side, substantially as set forth.

4. The combination with a tubular lantern frame having ribs on the outer sides of the tubes and pivot sockets for a bail in the plane of said ribs, of a bail pivoted in said sockets and offset on one side of the lantern forwardly and on the other side rearwardly and having, adjacent to its offset portions, inwardly projecting bends adapted to engage on one side of the lantern against the front side and on the other side of the lantern against the rear side of the adjacent rib, substantially as set forth.

Witness my hand in the presence of two subscribing witnesses.

CHARLES BERGENER.

Witnesses:
   WALLACE I. MILLER,
   LEO. E. MASSETH.